United States Patent
Singh et al.

(10) Patent No.: US 6,477,540 B1
(45) Date of Patent: Nov. 5, 2002

(54) METHOD AND APPARATUS FOR USING JAVA AS A STORED PROCEDURE LANGUAGE AND AS AN EMBEDDED LANGUAGE ON A CLIENT

(75) Inventors: Ashutosh Singh, San Jose, CA (US); Jignesh M. Patel, Ann Arbor, MI (US); Navin Kabra, Madison, WI (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/470,228

(22) Filed: Dec. 22, 1999

(51) Int. Cl.⁷ ............................................. G06F 17/30
(52) U.S. Cl. .......................... 707/103 R; 707/10; 707/3
(58) Field of Search ............................. 707/103 R, 10, 707/2, 206, 3; 709/102, 226, 231; 717/107; 710/33; 714/35

(56) References Cited

U.S. PATENT DOCUMENTS

| | | | |
|---|---|---|---|
| 5,553,234 A | | 9/1996 | Cotner et al. .................. 714/16 |
| 6,266,716 B1 | * | 7/2001 | Wilson et al. ................. 710/33 |
| 6,289,382 B1 | * | 9/2001 | Bowman-Amuah ......... 709/226 |

OTHER PUBLICATIONS

Enge, R.K. et al. discloses "using Java to add "stored procedures" to databases"; Sch. of Comp. Sci., Florida Int. Univ, Miami Florida, in Object–Oriented Languages and Systems, pp. 322–331, (Aug. 1–5, 1999).*

* cited by examiner

Primary Examiner—Diane D. Mizrahi
(74) Attorney, Agent, or Firm—Gates & Cooper

(57) ABSTRACT

One or more embodiments of the invention provide the ability to utilize the Java programming language as a stored procedure language. One or more embodiments of the invention provide for Java abstract data types (ADT) that map to ADT attributes from a database. The Java ADT can then be manipulated in an application written in the Java programming language such as a stored procedure. Each ADT attribute from a database is mapped to a Java class by wrapping the ADT definition (which is commonly written in C ++) in a Java wrapper. The wrapping process enables a user to write any client side Java application. Once the ADTs are wrapped and a stored procedure is created, the stored procedure must be able to execute. Enhancements permit a stored procedure written in the Java programming language to execute. Such enhancements include a server side cursor that the stored procedure can use to run SQL queries. Additionally, the server has been enhanced to link to a Java virtual machine that can be used to execute the bytecodes of the stored procedure written in the Java programming language.

15 Claims, 7 Drawing Sheets

METHOD AND APPARATUS FOR USING JAVA AS A STORED PROCEDURE LANGUAGE AND AS AN EMBEDDED LANGUAGE ON A CLIENT

CROSS REFERENCE TO RELATED APPLICATIONS

This application is related to the following co-pending and commonly assigned patent applications, which are incorporated by reference herein:

Pending application Serial No. 09/470,215 entitled "METHOD AND APPARATUS FOR PARALLEL EXECUTION OF SQL FROM STORED PROCEDURES" filed on the same date herewith, by Navin Kabra, Jignesh Patel, Jie-Bing Yu, Biswadeep Nag, and Jian-Jun Chen.

Pending application Serial No. 09/449,704 entitled "METHOD AND APPARATUS FOR FETCHING ARRAY BASED OBJECTS BY DIRECT DELIVERY AND BATCHING" filed on Nov. 24, 1999, by Zhe Wang, Biswadeep Nag, Jie-Bing Yu, and Jignesh Patel, Pending application Ser. No. 09,449,085 entitled "QUERY MONITOR PLAYBACK MECHANISM FOR POST-MORTEM PERFORMANCE ANALYSIS" filed on Nov. 24, 1999, by Jie-Bing Yu, Jun Li, and Karthikeyan Ramasamy.

BACKGROUND OF THE INVENTION

1. Field of the Invention

The present invention relates to systems and methods for performing queries on data stored in a database, and in particular to a method and apparatus for using Java as a stored procedure language and as an embedded language on a client.

2. Description of the Related Art

Databases use stored procedures to execute a set of tasks that an application requires inside a database engine. These stored procedures have to be written in some programming language. The prior art does not provide the ability to utilize the Java programming language as the stored procedure programming language. The field of the invention and the prior art may be better understood by describing databases, stored procedures, and the Java programming language.

Databases

The ability to manage massive amounts of information has become a virtual necessity in business today. The information and data are often stored in related files. A set of related files is referred to as a database. A database management system (DBMS) creates and manages one or more databases. Today, DBMSs can manage any form of data including text, images, sound and video. Further, large-scale integrated DBMS' provide an efficient, consistent, and secure means for storing and retrieving the vast amounts of data.

Certain computer languages have been developed and utilized to interact with and manipulate the data. For example, SQL (Structured Query Language) is a language used to interrogate and process data in a relational database (a database in which relationships are established between files and information stored in the database). Originally developed for mainframes, most database systems designed for client/server environments support SQL. SQL commands can be used to interactively work with a database or can be embedded within a programming language to interface to a database. Thus, methods and functions may embed and utilize SQL commands.

A client-server environment provides the ability to split an application or responsibilities into different locations/computers. Half of an application may run on a client machine and the other half may run on a server machine. For example, data may be stored on a server and the client is provided with an interface to interact with and modify or manipulate the data. To interface with a server-side database from the client, a client typically utilizes embedded programming languages such as COBOL.

Stored Procedures

Users/programmers often need to invoke the same set of commands (or the same set of commands with different parameters) at varying times and locations of a program. In such a situation, the query may be placed into a stored procedure. A stored procedure is a batch of SQL statements stored in a database/on a server, that may be partially or fully processed/compiled before it is stored (or upon its first invocation). Additionally, a stored procedure is a method or procedure written in a programming language that is partially or fully processed/compiled before it is stored (or upon its first invocation).

Stored procedures may be called directly from a client or from a database trigger and are often stored on the server. A database trigger is a user defined mechanism that causes a stored procedure to automatically initiate and execute upon the occurrence of the user specified events in the database (i.e., when the trigger "fires"). Thus, the trigger will not "fire" unless the event(s) specified by the user occurs. For example, a user may define a trigger to automatically "fir" whenever a user updates, deletes, or inserts data.

Since the stored procedure is stored on a server, the stored procedure is available to all clients and does not need to be replicated in each client. Further, by storing the stored procedure on the server, when the stored procedure is modified, all clients automatically get/have access to the new version. This saves programming effort especially when different client user interfaces and development systems are used. Further, this allows stored procedures to be an easy mechanism for sharing complex queries and functions between multiple applications. Additionally, SQL and stored procedures may call other stored procedures and may be written independently from (and without knowledge of) the underlying DBMS.

A stored procedure may be partially or completely processed/compiled before it is stored on the database. Consequently, the stored procedure does not have to be parsed and compiled each time it is invoked. Further, because a stored procedure is stored in a compiled format, it executes faster than if its constituent commands were executed individually.

Alternatively, a stored procedure may not be compiled prior to storage but may be automatically compiled the first time the procedure is invoked. As part of such a compilation, a query execution plan may be generated. The query execution plan describes the order in which tables are to be accessed and the indexes to be used. Further, the query execution plan is optimized for the stored procedure parameters and data in the database tables at the time the stored procedure is first executed.

A stored procedure may be invoked by its name. The caller can pass parameters to and receive results from the stored procedure. A user can create and name a stored procedure to execute specific database queries and perform other database tasks. For example, a user may create a stored procedure that returns the number of videos of a particular movie remaining in a video store for the video title that is specified at the time the stored procedure is called.

Stored procedures may also maintain the integrity of the database and prevent unauthorized users from modifying certain entries. For example, a user may be given the right to call a stored procedure that updates a table or set of tables but denied the right to update the tables directly.

Stored procedures may be created using a variety of mechanisms. The following format may be utilized to declare a stored procedure:
    create proc {procedure name} as
        {statement of block of statements}
For example the following stored procedure called myproc will return the number of Casablanca videos left in a video store as well as other movie titles, the rental price of those movie titles, and the location of those videos when Humphrey Bogart is an actor in the movie:

```
create proc myproc
as
begin
    select inv_videos
    from video
    where title_id = "Casablanca"
    select title_id, rental_price, location
    from video
    where actor = "Humphrey Bogart"
end
```

As described above, stored procedures can also be passed parameters.

Parameters may be defined as part of the stored procedure creation statement. The syntax of a "create proc" command with parameters is:

```
create proc {proc name}
    ( @{param_name} {param_type},
        @{param_name} {param_type},
    )
as
    {statement}
```

For example, the following stored procedure may be passed the @mytitle and @myactor parameters for use in the select query:

```
create proc myproc
    ( @mytitle char,
        @myactor char
    )
as
begin
    select inv_videos, title_id, rental_price, location
    from video
    where title_id = @mytitle
        or actor = @myactor
end
```

Once a stored procedure has been created, a user can invoke the stored procedure using the following syntax:
    exec [database.owner.] {procname} {opt params}
In the above syntax, "database" and "owner" will default to the current database and the current dbo (database owner). For example, the following command may invoke the stored procedure "myproc" defined above:
    exec myproc "Casablanca", "Humphrey Bogart"
In this example, the user would see the same results as if the following command were utilized:

```
select inv_videos, title_id, rental_price, location
    from video
    where title_id = "Casablanca"
        or actor = "Humphrey Bogart"
```

Additionally, the "exec" portion of an invocation of a stored procedure is not necessary if the stored procedure call is the first line in a batch.

Stored procedures can also have a "return" status. A "return" statement returns from the stored procedure with an optional status parameter. The return status is zero for success, or negative otherwise. Negative values between −1 and −99 are reserved. For example, the following stored procedure returns a negative value (−999) if no rows/records are in the result set and a 0 if rows/records are in the result set:

```
create myproc ( @mytitle char, @myactor char)
as
begin
    select title_id, rental_price, location
    from video
    where title_id = @mytitle
        or actor = @myactor
    if @@rowcount = 0
        return −999
    else
        return 0
end
```

The following commands illustrate the invocation of the above stored procedure with a return status:

```
declare @mystatus int
exec @mystatus = myproc "Casablanca", "Humphrey Bogart"
if @mystatus != 0
    begin
        {do error processing}
    end
else
    begin
        {do normal processing}
    end
```

In addition to providing parameters when invoking a stored procedure, default values for the parameters may be specified:

```
create proc myproc
    ( @myparam1      int = 0
        @myparam2    int = null,
        @myparam3    char(20) = "mydefault"
    )
as . . .
```

The above stored procedure provides a default value of 0 for @myparam1, a default value of null for @myparam2, and a default value of "mydefault" for @myparam3. To invoke the stored procedure, the user may specify the values for one or more parameters, if desired, or may allow one or more of the default values to be utilized:
    exec myproc 1 /* params 2 & 3 default */
In the above invocation, only @myparam1 is specified in the execution line. Consequently, the specified default values for @myparam2 and @myparam3 are utilized (i.e., null and "mydefault").

Additionally, stored procedures can have output parameters as demonstrated below:

```
create proc myproc
    ( @myparam1        int
        @myoutparam    int output
    )
as
    begin
        select @myoutparam = count(*)
        from titles
        where x > @myparam1
    end
```

The output for the above stored procedure is the number of rows (i.e., the count) in the titles table where the value of x is greater than @myparam1.

Java Programming Language

The Java programming language is a popular programming language originally developed by Sun Microsystems, Inc. The Java programming language features object-oriented programming, portability, and safe execution.

As with many other programming languages, the Java programming language uses a compiler to convert human-readable source code into executable programs. A Java compiler generates architecture independent bytecodes instead of code that can be executed by particular hardware. The bytecodes can be executed by a Java Virtual Machine (Java VM), an idealized processor chip usually implemented in software rather than hardware.

Due to its popularity and wide use throughout the world, it is desirable to utilize the Java programming language in a variety of applications. One such application is that of stored procedures. However, the prior art does not provide the ability to utilize the Java programming language as a stored procedure language to interact with a relational database.

SUMMARY OF THE INVENTION

To address the requirements described above, the present invention discloses a method, apparatus, and an article of manufacture for using the Java programming language as a stored procedure language and as an embedded language on a client.

Databases used stored procedures to execute a set of tasks that the application requires inside of a database engine. The set of tasks is recorded in a stored procedure and may be executed by the database every time a trigger "fires". One or more embodiments of the invention provide the ability to utilize the Java programming language as the stored procedure language. In such embodiments the same stored procedure can be used both on the server side and the client side. This allows an application developer to test the stored procedure code on the client side and when the code is debugged, it can be sent to the server, where it runs within the database server.

One or more embodiments of the invention provide for Java abstract data types (ADT) that map to ADT attributes from a database. The Java ADT can then be manipulated in an application written in the Java programming language such as a stored procedure. In such embodiments, each ADT attribute from a database is mapped to a Java class by wrapping the ADT definition (which is commonly written in C ++) in a Java wrapper. The wrapping process enables a user to write any client side Java application.

Once the ADTs are wrapped and a stored procedure is created, the stored procedure must be able to execute. In one or more embodiments of the invention, enhancements permit a stored procedure written in the Java programming language to execute. Such enhancements include a server side cursor that the stored procedure can use to run SQL queries. Additionally, the server has been enhanced to link to a Java virtual machine that can be used to execute the bytecodes of the stored procedure written in the Java programming language.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

One or more embodiments of the invention enhances a database server with mechanisms that will allow the database server to execute stored procedures written in the Java programming language. Further, in one or more embodiments of the invention, the same stored procedure written in the Java programming language can be used both on the server side and the client side. This allows an application developer to test the stored procedure code on the client side and when the code is debugged, it can be sent to the server, where it runs within the database server.

In one or more embodiments of the invention, a relational database or an object relational database (e.g., a Teradata® Object Relational (TOR) database) may be utilized. In an object relational database, tables of information may contain both coded (alphanumeric) data and multimedia object data. These tables are referred to as object-relational tables. Coded data is contained in table columns defined with traditional relational database data types, such as integer, character, floating point, and date. Objects are contained in table columns defined with Abstract Data Types (ADT) such as text, images, audio, and video. The objects persist in the table such that they may be retrieved and used instead of creating a new instance of an object. Further SQL commands may be utilized to interact with and manipulate the records/information in the tables. Alternatively, data in an object relational database may be wrapped or encapsulated by an object that provides an interface to edit, delete, manipulate, etc. the data.

Figure 1:
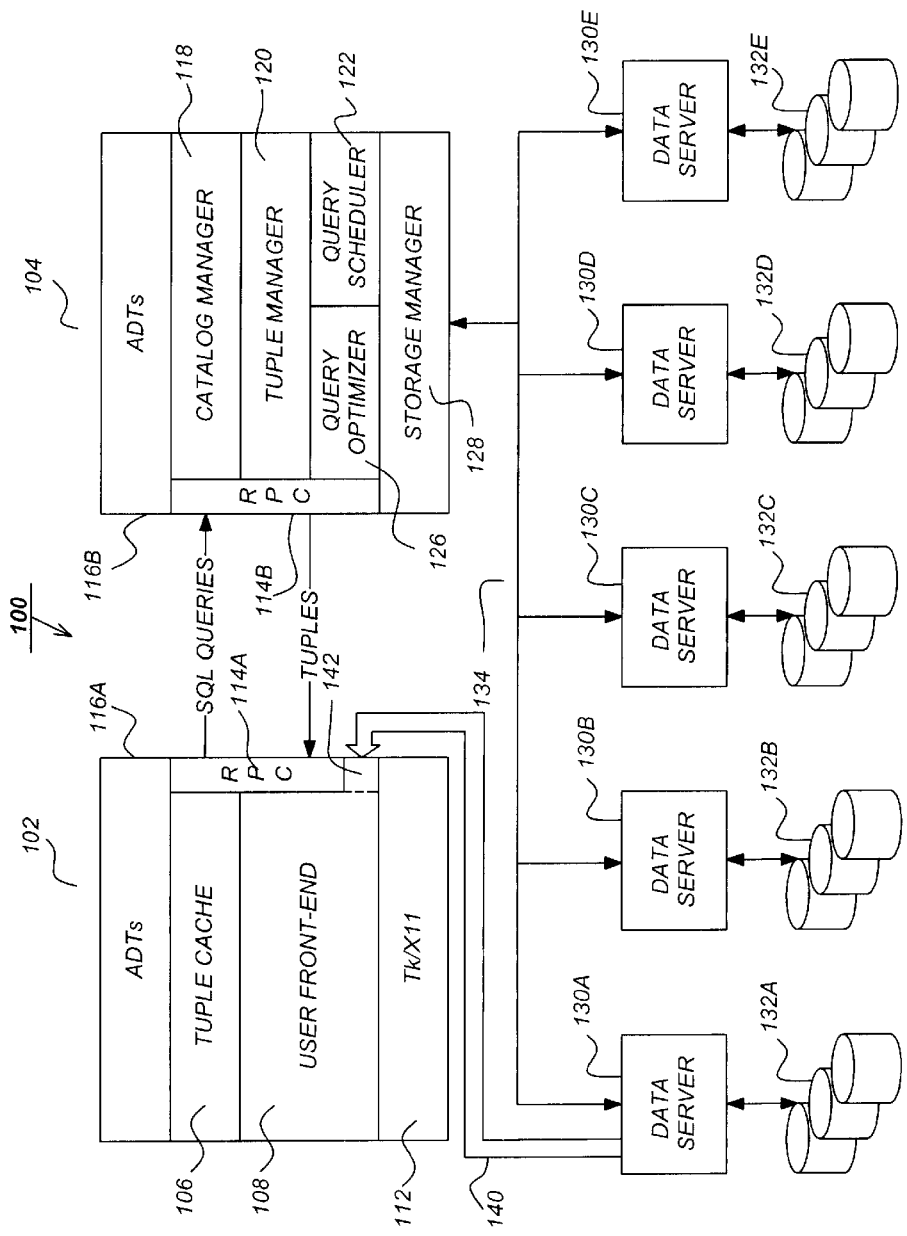
FIG. 1 is a block diagram showing an exemplary environment for practicing one or more embodiments of the present invention.

FIG. 1 is a diagram showing an exemplary environment in which one or more embodiments of the invention provide for parallel execution of SQL commands. The database system 100 uses a client-server architecture comprising a query scheduler 122 implemented in a query coordinator (QC) 104 and one or more data servers (DS) 130A–130E (hereinafter referred to as data server(s) 130) storing data in one or more data storage devices 132A–132E (hereinafter referred to as data storage device(s) 132. The data servers 130 also perform portions of the execution plan in execution threads as determined by the query coordinator 104 to execute the query. The query coordinator 104 and data servers 130 may be implemented in separate machines, or may be implemented as separate or related processes in a single machine. The QC 104 and the DS 130 communicate via a communication infrastructure 134 which can automatically select the most efficient mechanism for the transport of data between the QC 104 and any one of the DS 130 elements. When a message is between processes or entities that do not share a common memory system, a transport protocol such as transmission control protocol (TCP) or message passing interface (MPI) can be utilized to transfer the information. However, when the communication is between processors on a symmetric multiprocessing system (SMP), memory may be used as the transport vehicle.

Client processes 102, which can include applications or graphical user interfaces (GUIs), can connect to the QC 104 for submitting a query. After parsing and optimization, the QC 104 generates an execution plan (referred to as an ASCII plan) for the query, performs further processing on the ASCII plan (discussed below), and transmits portions of that plan to the appropriate data servers 130A–130E for execution. Hence, the QC 104 controls the parallel execution of the query on the DS 130 processes. Query results including result sets are collected by the QC 104 for delivery back to the client process 102.

The QC 104 and DS 130 processes can be implemented as multithreaded processes on top of a storage manager 128. The storage manager 128 provides storage volumes, files of untyped objects, B+ trees and R* trees. Objects can be arbitrarily large, up to the size of the storage volume. In one embodiment, allocation of storage space within a storage volume is performed in terms of fixed size extents. The associated I/O processes and the main storage manager 128 server process share the storage manager 128 buffer pool, which is kept in shared memory.

The database system 100 uses many basic parallelism mechanisms. Tables may be fully partitioned across all disks in the system 100 using round robin, hash, or spatial declustering. When a scan or selection query is executed, a separate thread is started for each fragment of each table.

In one embodiment, the database system 100 also uses a push model of parallelism to implement partitioned execution in which tuples are pushed from leaves of the operator tree upward. Every database system 100 operator (e.g. join, sort, select, . . . ) takes its input from an input stream and places its result tuples on an output stream. The streams themselves are C ++objects and can be specialized in the form of "file streams" and "network streams". File streams are used to read/write tuples from/to disk. Network streams are used to move data between operators either through shared-memory or across a communications network via a transport protocol (e.g. TCP/IP or MPI). In addition to providing transparent communication between operators on the same or different processors, network streams also provide a flow-control mechanism that is used to regulate the execution rates of the different operators in the pipeline.

Network streams can be further specialized into split streams, which are used to demultiplex an output stream into multiple output streams based on a function being applied to each tuple. Split streams are one of the key mechanisms used to parallelize queries. Since all types of streams are derived from a base stream class, their interfaces are identical and the implementation of each operator can be totally isolated from the type of stream it reads or writes. At runtime, the scheduler thread (running in the QC process 104 through Query Scheduler 122), which is used to control the parallel execution of the query, instantiates the correct type of stream objects to connect the operators. Alternatively, when a stored procedure is executing, the stored procedure may instantiate the correct type of stream object in order to retrieve the results from query execution (see description below).

For the most part, the database system uses standard algorithms for each of the basic relational operators. Indexed selections are provided for both non-spatial and spatial selections. For join operations, the query optimizer 126 can choose from nested loops, indexed nested loops, and dynamic memory hybrid hash joins. The database system's query optimizer 126 considers replicating small outer tables when an index exists on the join column of the inner table.

The database system uses a two-phase approach for the parallel execution of aggregate operations. For example, consider a query involving an average operator with a group by clause. During the first phase each participating thread processes its fragment of the input table producing a running sum and count for each group. During the second phase a single processor (typically) combines the results from the first phase to produce an average value for each group.

Since standard SQL has a well defined set of aggregate operators, for each operator the functions that must be performed during the first and second phases are known when the system is being built and, hence, can be hard coded into the system. However, in the case of an object-relational system that supports type extensibility, the set of aggregate operators is not known in advance as each new type added to the system may introduce new operators. Hence, a mechanism is provided for specifying the first and second phase function with the definition of each aggregate.

The query coordinator 104 also comprises a tuple manager 120, a catalog manager 118, a query optimizer 126, a query scheduler 122, and a storage manager a 128. The tuple manager 120 receives the tuples from the data servers 130, formats and processes the tuples, and passes them along to the client program 102. The catalog manager 118 manages metadata regarding the tables and types in the database. The query optimizer generates an execution plan (referred to as an ASCII plan) for queries received from the client process 102.

Thus, in accordance with one or more embodiments of the invention, when a query comes into the system, the query is sent to query optimizer 126 where the query is parsed/typechecked, optimized, and generated into an ASCII plan (a sequential execution plan). The ASCII plan is then forwarded to query scheduler 122. When the ASCII plan is forwarded from query optimizer 126 to query scheduler 122, a parallelizer mechanism of query scheduler 122 receives the ASCII plan and generates a parallel execution plan. The parallel execution plan is then sent to a dispatcher. The dispatcher performs the execution of the parallel plan. In one or more embodiments the dispatcher is located in the data server 130. By locating the dispatcher on data server 130, SQL from within a stored procedure may be executed in parallel.

Client program 102 comprises a front end 108, which provides a graphical user interface that supports querying, browsing, and updating of database objects through either its graphical or textual user interfaces. In either case, the front end transforms a query into an extended SQL syntax and transmits it to the data server 130 for execution. After executing the query, the query coordinator 104 transmits the results back to the client program 102 in the form of a set of tuples that can be iterated over using a cursor mechanism. In one embodiment, all communications between the front end 108 and the processes implemented in the query coordinator 104 are in the form of remote procedure calls 114A and 114B implemented over a Transmission Control Protocol/Internet Protocol (TCP/IP). The client process 102 also comprises a tuple cache 106 for retaining tuples received from the query coordinator 104. Abstract Data Types (ADTs) 116A and 116B can be stored and/or processed in either the query coordinator 104 or the client process 102.

The client front end 108 permits the display of objects with spatial attributes on a 2-D map. For objects with multiple spatial attributes, one of the spatial attributes can be used to specify the position of the object on the screen. The spatial ADTs currently supported include points, closed polygons, polylines, and raster images.

The client front end 108 can also present a layered display of overlapping spatial attributes from different queries or tables. For example, one can display city objects that satisfy a certain predicate (e.g. population >300 K) in one layer on top of a second layer of country objects. The client front end 108 also allows the user to query through a graphical interface; implicitly issuing spatial queries by zooming, clicking, or sketching a rubber-banded box on the 2-D map. The graphical capabilities of the client can be implemented using toolkits such as Tk/X 11. Further, the user can query by explicitly composing ad-hoc queries in the database system's 100 extended SQL syntax.

The user can use the client front end 108 to browse the objects from a table. $In this mode, attributes are displayed as ASCII strings. The front end 108 can also be used to update database objects. Object(s) to be updated can be selected either by pointing-and-clicking on the 2-D map or by selecting via the textual browser.

Finally, the client front end 108 can also be used to perform general catalog operations including browsing, creating new databases, defining new tables, creating indices on attributes, and bulk loading data into tables from external files.

The database system 100 also advantageously uses a second communication path 140 to transmit selected data such as master object data and large objects to the client 102, as described further below. The direct data transfer module 142 in the client 102 receives this data.

Figure 2:
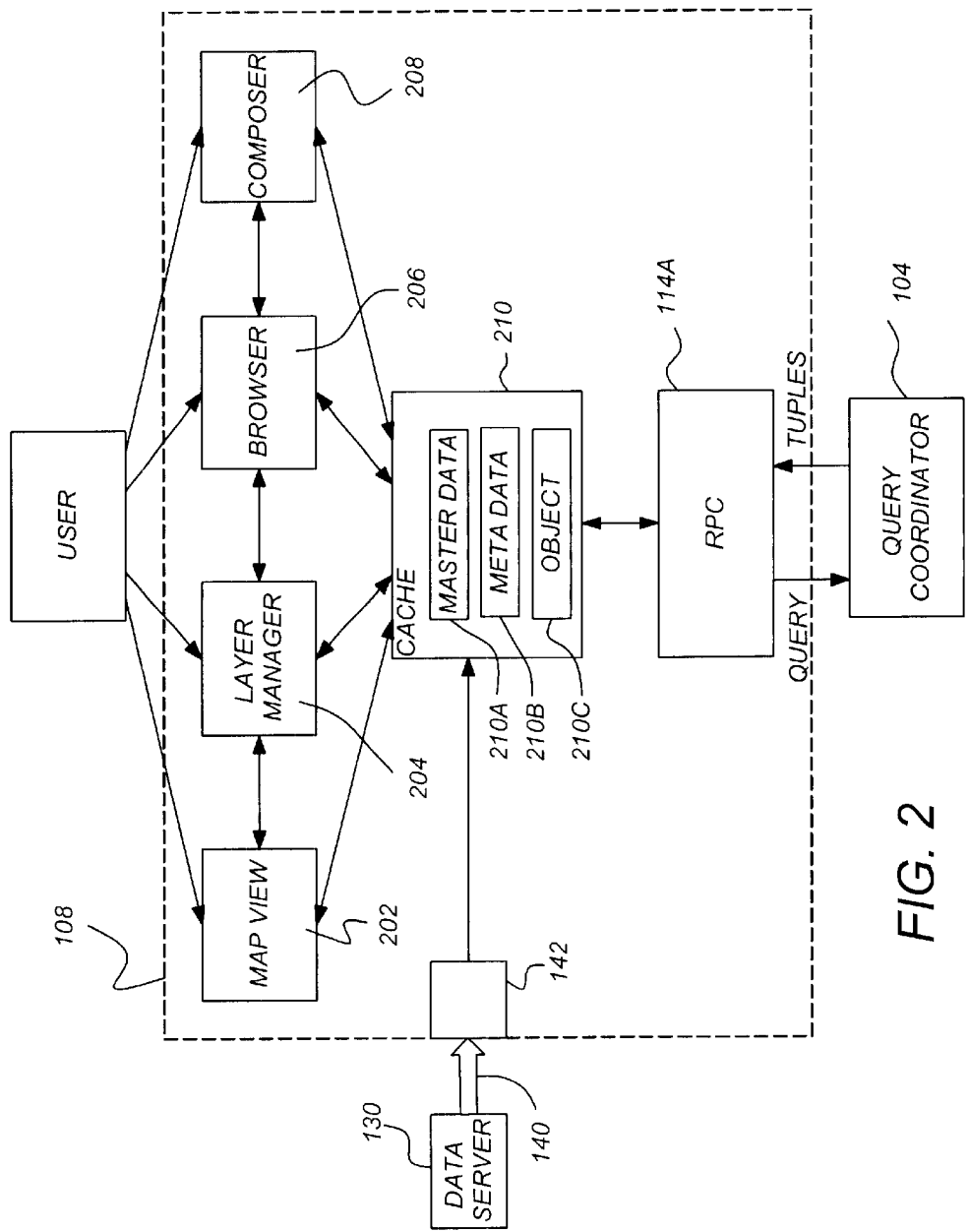
FIG. 2 is a diagram showing one or more embodiments of the user front end of the exemplary hardware environment depicted in FIG. 1.

FIG. 2 is a diagram showing one embodiment of the user front end of the exemplary environment depicted in FIG. 1. The client front end 108 comprises a map view 202, layer manager 204, browser 206 and a query composer 208. The map view 202 is responsible for displaying and manipulating objects contained in one or more layers. The current position of the cursor is continuously displayed in a subwindow in units of the map projection system. Users can point and click on displayed objects to view their non-spatial attributes. The layer manager 204 is responsible for adding, deleting, hiding, and reordering layers displayed by the map view 202. Each layer corresponds to a table of objects produced by executing some query. The extent browser 206 allows a user to view any database table and adjust the way it should be displayed by the map view 202. The selected table becomes a new layer with its spatial attributes displayable via the map view 202.

The query composer 208 allows a user to compose a SQL query using a simple text editor. The RPC 114 is the interface to the query coordinator 104. It ships SQL queries to the query coordinator 104 for execution and retrieves result tuples into the cache 210. The cache 210 comprises a master data cache 210A, a metadata cache 210B and an object cache 210C. The object cache 210C caches the result of a query in formats understood by the map view 202. The metadata cache 210B stores the catalog information of the currently open database. The master data cache 210A stores retrieved master data as described further below. In one embodiment, the object cache 210C also caches the objects downloaded from the data servers 130. FIG. 2 also shows the second communication path 140 from the data server 130 to the user front end 108 via the direct data transfer module 142.

Array-based abstract data types (ADTs) can be used as basis for a number of useful data types, including BLOBs, CLOBs, video, audio, text, image, maps and other large objects. Array-based ADT use an external out-of-line storage for very large objects.

Figure 3A:
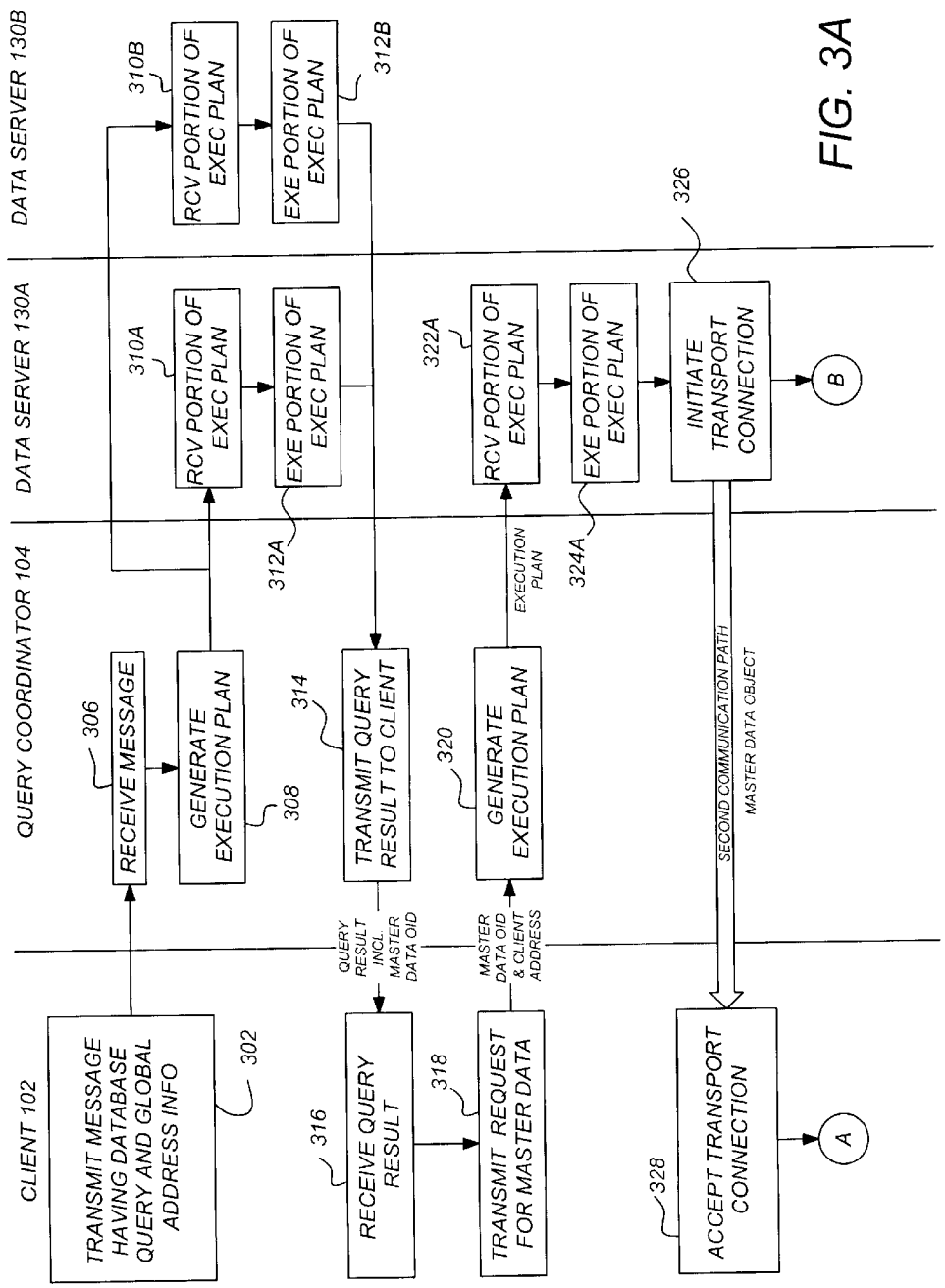
FIGS. 3A and 3B are diagrams illustrating one or more embodiments of the invention.

FIG. 3A is a diagram illustrating one or more embodiments of the present invention. The client 102 transmits 302 a message to the query coordinator 104. The message includes a database query, and may optionally include client address information. The query coordinator 104 receives 306 the message and using the information in the message, generates 308 an execution plan (i.e., query optimizer 126 generates the ASCII plan). The execution plan is then parsed into one or more portions, each of which represents an execution plan thread (an exec_plan_t). These are transmitted to the data servers 130, which receive 310 and execute 312 their respective portions of the execution plan. Results from the data servers 130 are transmitted to the query coordinator 104, which compiles the results into a query result having a result set. This information is transmitted 314 back to the client 102. In one embodiment, this query result information includes an object identification (OID) for the master data (MOID). Other query result information may also be included, such as the dimensions and size of the master data.

It is important to note that master data associated with the MOID (that which is responsive to the database query) can be quite large. Hence, while the master data could be delivered via the query coordinator 104 to the client 102, direct transfer from the data server in such cases best accomplishes such delivery.

Returning to FIG. 3A, the client transmits 318 a request for the master data. Included in this request is the OID for the master data (the MOID). In one embodiment, this client address information is globally unique and includes the client address and port.

The query coordinator 104 accepts this message, and from the information in the message, generates 320 another execution plan. This execution plan (which includes the client global address) is simpler than the one generated previously (to respond to the database query), but nonetheless, still requires the generation of a fetch object operator. Alternatively, the MOID can be transmitted from the client 102 to the data server 130 without intervention of the query coordinator 104, or the query coordinator 104 can simply accept the request for the master data and pass it along to the data server 130.

The data server 130 receives 322 and executes 324 the applicable portion of the execution plan, and initiates 326 a transport connection with the client 102 via the second communication path 140 using the client IP address and port number. The client 102 accepts 328 the transport connection.

Figure 3B:
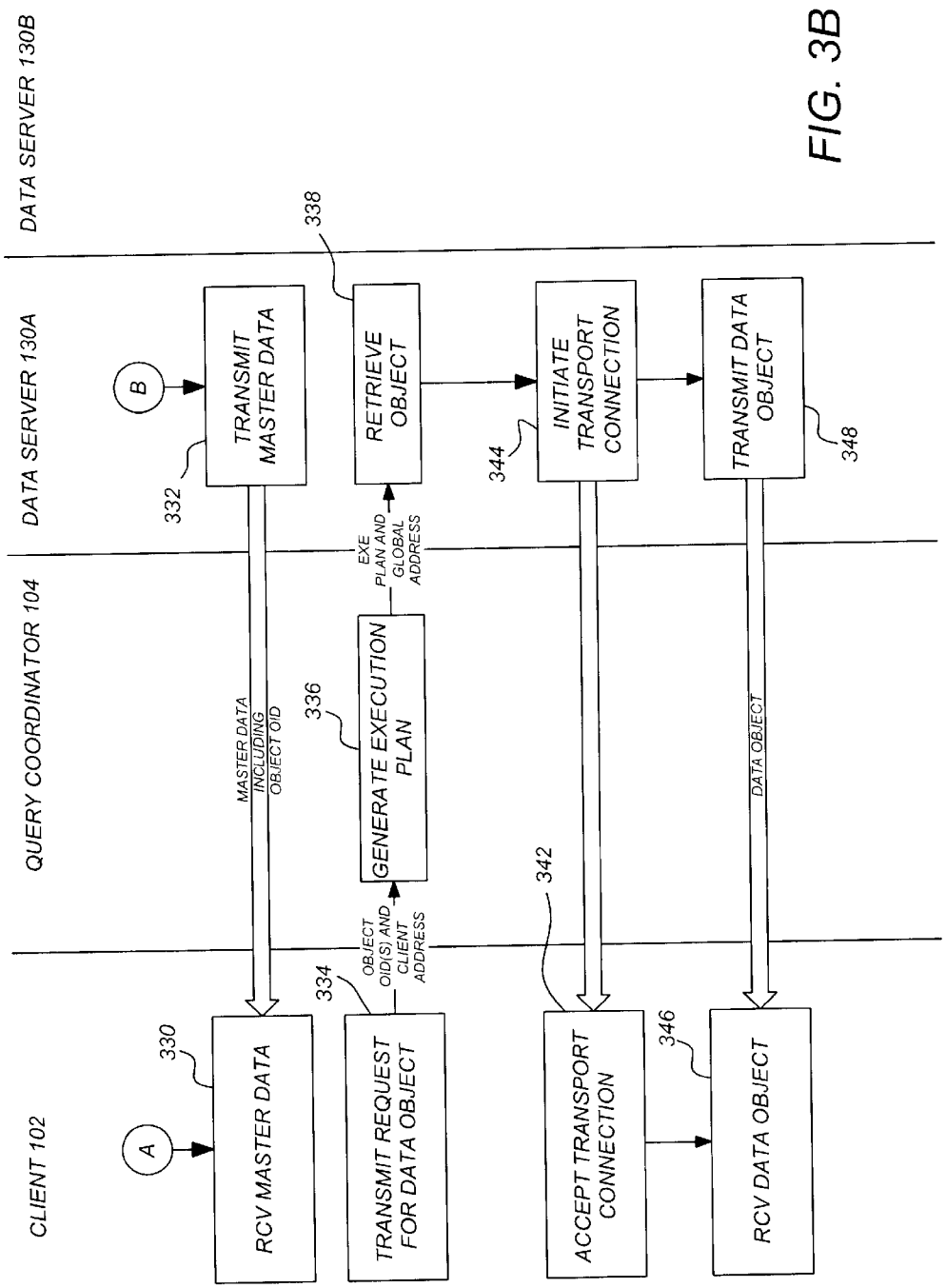

FIG. 3B shows the client data server transmitting 332 the master data via the transport connection on the second communication path 140 to the client 102. In one embodiment, the master data includes information such as the dimensions and size of the related master object, and an object identification (AOID) for the data objects associated with the master data object.

The user may then request one or more data objects in the array that cumulatively represents the master data object. This data is represented in one of the data objects, having related object identifications (AOIDs) that were transmitted with the master data object. That request can be submitted by transmitting a message including the AOIDs of the data objects of interest and the address of the client 102 to the query coordinator 104. The query coordinator 104 again generates 336 a simple execution plan designed to retrieve the data objects of interest from the data server 130. The execution plan and the address of the client 102 are sent to the data server 130, which retrieves 338 the objects from the storage manager. In one embodiment, the data server uses the client address to initiate 344 a transport connection with the client 102. The client 102 accepts 342 the transport connection. In another embodiment of the present invention, the transport connection originally established with the client 102 (in block 326) is maintained for the duration of the session with the client 102. In this embodiment, there is no need to re-establish the transport connection between the data server 130 and the client 102. In any case, the data server 130 transmits 348 the requested data object, and the client 102 receives it through the second communication path 140.

Using the foregoing technique, all of the AOIDs for the master data are collected across all of the tuples in the current query result set, and are fetched all in one batch. Similarly, the array data objects can be fetched in batch mode. The same approach can be applied to the real objects themselves.

Stored Procedures

One or more embodiments of the invention provide for using the Java programming language as a stored procedure language. As described above, stored procedures are typically utilized or invoked within the RDBMS (Relational Database Management System).

Stored procedures can be supplied from many sources. Database users can write stored procedures. Stored procedures that perform a commonly used set of commands can also be supplied by the DBMS owner such as NCR Corporation, the assignee of the present invention. Alternatively, third-party vendors can supply stored procedures.

A stored procedure written in the Java programming language needs to access the information that is stored in the database. The most natural way to access this information is to call/execute an SQL query using a Java Database Connectivity UDBC) application programming interface (API). JDBC is a fully functional SQL environment that can be connected to almost any relational database. It uses Java classes to represent SQL queries and connections, and allows Java programs to directly access compatible databases.

A JDBC application connects to a database using a special piece of bridge software that is provided by the database's creator. This bridge allows Java SQL calls to be mapped to logical SQL calls on the actual data. Once an SQL command has been executed, the Java program can access the tuples (a record or row of information) in the result set.

In one or more embodiments of the invention, the tuples in a result set are made up of attributes that have some type (i.e., character, integer, float, abstract data type (ADT) defined by the programmer, etc.). To manipulate the ADT tuples, one or more embodiments of the invention provide a Java ADT that maps the attributes to Java objects (which can then be manipulated in Java).

Figure 4:
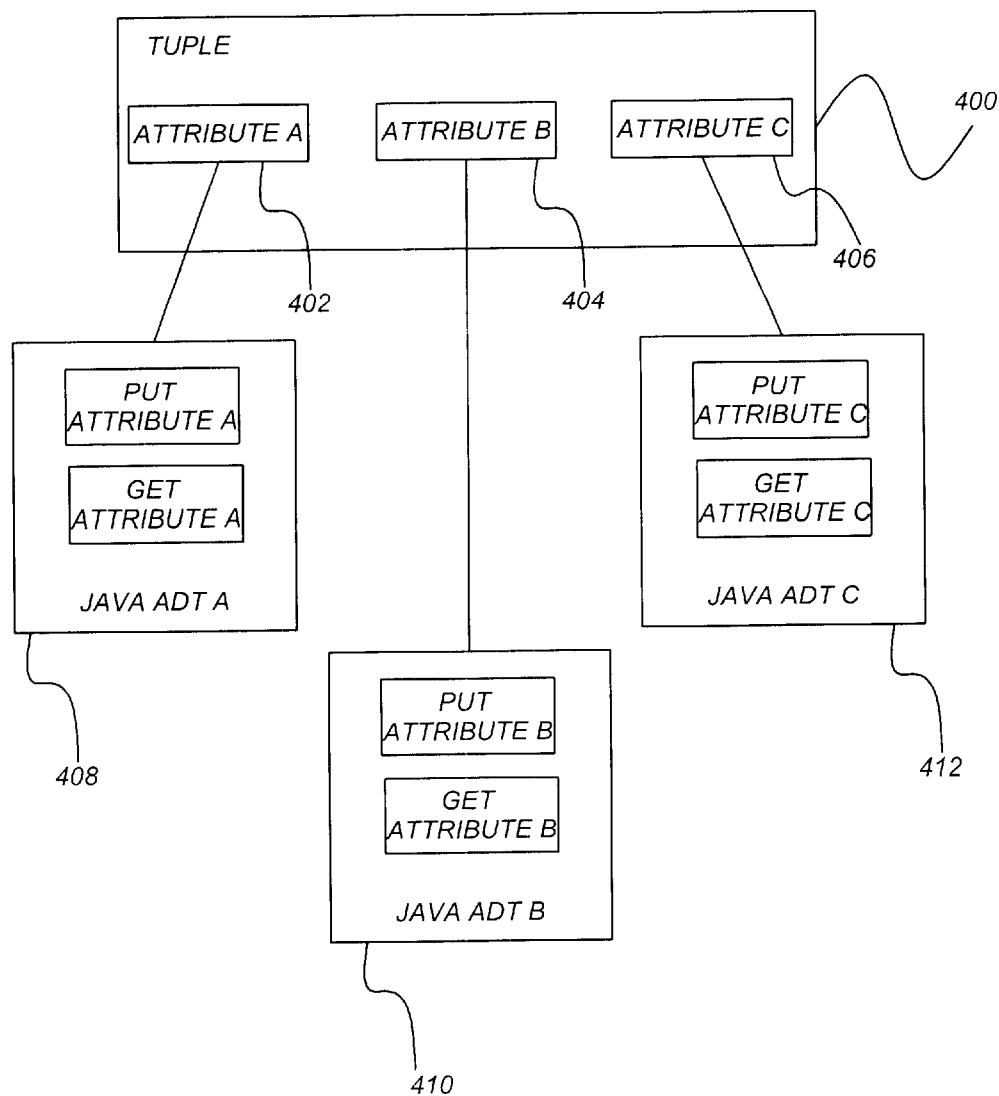
FIG. 4 illustrates Java ADT definitions in accordance with one or more embodiments of the invention.

To bridge the impedance mismatch between the database types of the tuples and Java types, one or more embodiments of the invention provide for Java ADT definitions as illustrated in FIG. 4. In such an embodiment, each database (or TOR) ADT 402–406 is mapped to a Java class by wrapping the database ADT definition (which is commonly written in C ++) into a Java wrapper (the Java ADT definition 408–412). Once wrapped, any application written in the Java programming language may utilize the Java ADT classes 408–412 to retrieve and edit the ADT attributes 402–406. Consequently, the wrapping process enables a user to write any client side application in the Java programming language.

In one or more embodiments of the invention, each Java ADT 408–412 is comprised of a put method and a get method. The put method enables the modification of an attribute of the ADT 402–406 in the database. The get method retrieves the value of the attribute from the ADT 402–406 in the database. For example, the ADT attribute A 402 is wrapped in Java ADT A 408 with get and put methods for retrieving and modifying ADT attribute A 402. Similarly, ADT attributes B 404 and C 406 are wrapped in Java ADT B 410 and Java ADT C 412 respectively, with get and put methods for retrieving and modifying ADT attribute B 404 and ADT attribute C 406. Each Java ADT 408–412 may be used to retrieve and edit the corresponding attribute 402–406. In one or more embodiments, the Java ADT 408–412 are subclasses or implementations of an interface or abstract class.

In one or more embodiments, the creator of the ADT 402–406 may provide the Java ADT 408–412 definition for the ADT 402–406. Accordingly, the Java ADT 408–412 get and put method definitions may be created when the ADT is created.

Figure 5:
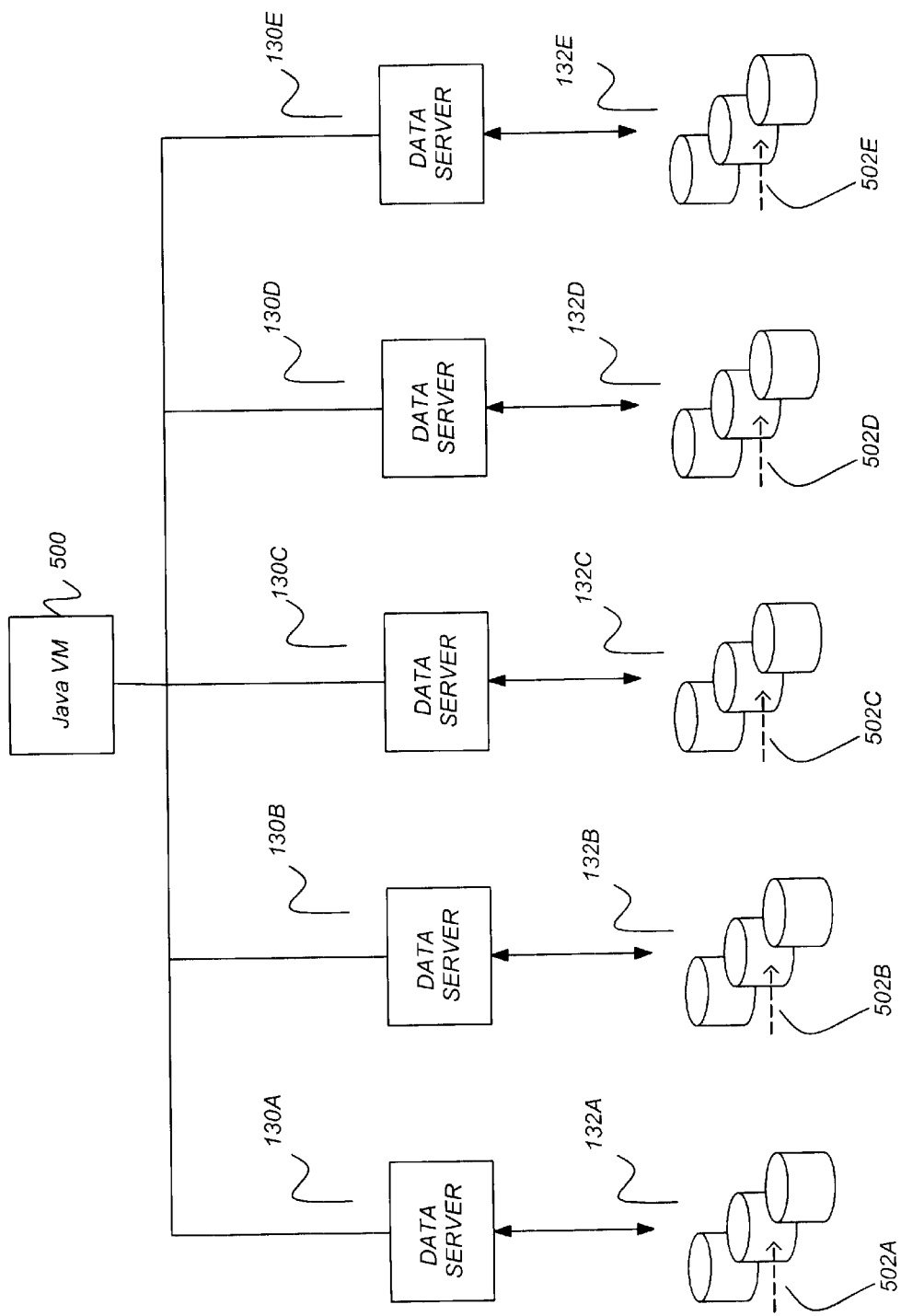
FIG. 5 illustrates the server side of the environment of FIG. 1 in accordance with one or more embodiments of the invention.

Once the stored procedure is written in the Java programming language and the Java ADT definitions have been created, the next step is that of running the stored procedure on the data server 130. FIG. 5 illustrates the server side of system 100 of FIG. 1 and the enhancements added to system 100 in accordance with one or more embodiments of the invention. So that the stored procedure can run SQL queries, a server side cursor 502 is needed. A cursor 502 is a pointer to the next record in a database. Either client program 102 or query coordinator 104 already utilizes a cursor 502. However, the cursor 502 is not available for use on data server 130. Consequently, one or more embodiments of the invention provide a cursor 502A–502E that can be used by the stored procedure on server 130 (a server side cursor 502). Server side cursors 502A–502E point to the next tuple/record in each data storage device 132 so that queries may be performed and results retrieved.

Additionally, one or more embodiments of the invention enhance the server 130 such that each data server 130 links to or contains a Java VM 500 that can be used to execute the stored procedure written in the Java programming language. Since a stored procedure is already compiled or partially compiled, a stored procedure written in the Java programming language is comprised of bytecodes. Thus, when a stored procedure is ready to execute, data server 130 links into the Java VM 500 which maintains the ability to execute the bytecodes of the stored procedure.

An example of an application that may utilize Java ADTs and stored procedures is a Java multimedia player. Tuples containing abstract data types (comprised of multimedia) are returned from a query and can be viewed in the multimedia player by clicking on a button. In such an embodiment, each multimedia ADT defined in the database (e.g., a sound ADT such as a .wav file, a video ADT such as an mpg file, etc.) are mapped or wrapped in a Java ADT 408–412. For example, one Java ADT 408 may be utilized to get and put a .wav file and another Java ADT 410 may be utilized to get and put a .mpg file. The Java program (i.e., the multimedia player) may use the Java ADTs 408 and 410 to view the ADT tuples 402 and 404 returned from the query. To run the multimedia player, the stored bytecodes are executed by Java VM 500.

Applications written in the Java programming language may be read by a Java VM 500 on either the client or the server 130. Consequently, the stored procedure may be executed on either the client or the server 130. By allowing the stored procedure to be executed on either the client or server 130, an application developer can test the stored procedure code on the client side and when the code is debugged, it can be sent to the server side where it runs within the data server 130.

Figure 6:
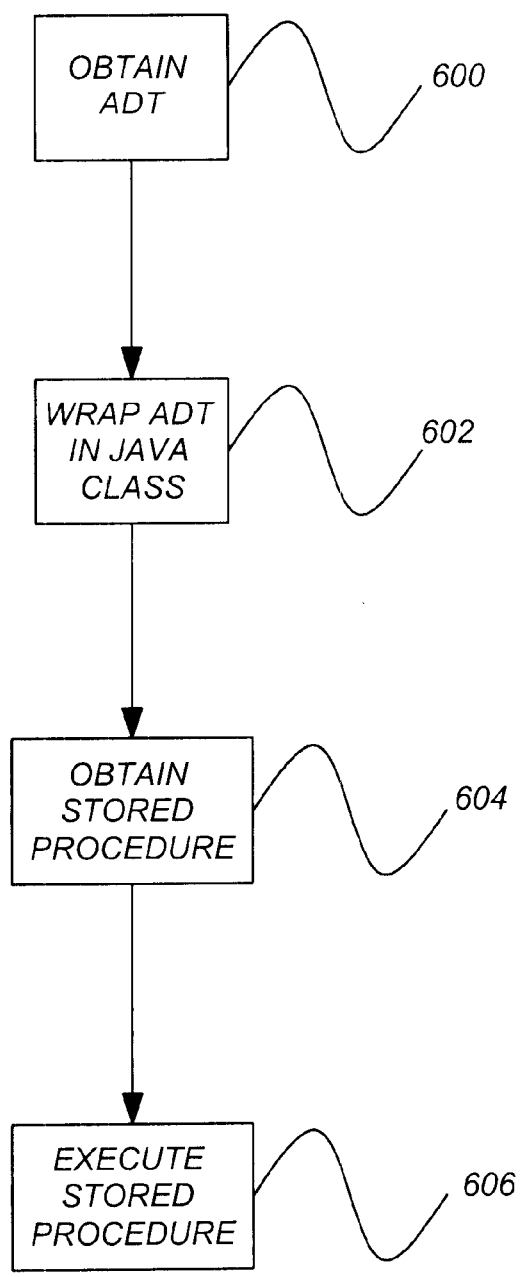
FIG. 6 is a flow chart illustrating the use of the Java programming language as a stored procedure language in accordance with one or more embodiments of the invention.

FIG. 6 is a flow chart illustrating a method of using the Java programming language as a stored procedure language in accordance with one or more embodiments of the invention. At step 600, an attribute 402–406 that is an ADT type is obtained. At step 602, the ADT attribute 402–406 is wrapped in a Java class 408–412. By wrapping the ADT definition 402–406 in a Java class 408–412, a Java ADT definition is created/obtained. The wrapping process may comprise creating a new Java class 408–412 or mapping the ADT attribute 402–406 to an existing Java class 408–412. At step 604, a stored procedure written in the Java programming language using the Java class 408–412 is obtained. At step 606, the stored procedure is executed in Java VM 500.

Hardware and Software Embodiments

Referring back to FIGS. 1 and 5, an exemplary hardware and software environment is shown that can be used to implement one or more embodiments of the invention. Each node (e.g., client program 102, QC 104, data server 130, data storage device 132, Java VM 500) may each comprise a computer, circuit, or chip that may have a processor and a memory, such as random access memory (RAM). Additionally, each node may be operatively coupled to a display, which presents images such as windows to the user on a graphical user interface (e.g., user front-end 108). Each node may be coupled to other devices, such as a keyboard, a mouse device, a printer, etc. Of course, those skilled in the art will recognize that any combination of the above components, or any number of different components, peripherals, and other devices, may be used with embodiments of the invention.

Generally, each node may operate under the control of an operating system stored in memory. In one or more embodiments, the client program 102 (and the other nodes) interfaces with the user to accept inputs and commands and to present results through a graphical user interface (GUI) (e.g., user front-end 108). The instructions performing the GUI functions can be resident or distributed in the operating system, a computer program, or implemented with special purpose memory and processors. Embodiments of the invention may also implement a compiler that allows an application program written in a programming language such as Java, COBOL, C ++, FORTRAN, or other language to be translated into processor readable code or bytecodes. After completion, the application may access and manipulate data stored in memory using the relationships and logic that was generated using the compiler. Embodiments of the invention also optionally comprise an external communication device such as a modem, satellite link, Ethernet card, or other device for communicating with other computers.

In one embodiment, instructions implementing the operating system, the computer program, the compiler, the virtual machine, and database records, tables and information are tangibly embodied in a computer-readable medium, e.g., data storage devices 132, which could include one or more fixed or removable data storage devices, such as a zip drive, floppy disc drive, hard drive, CD-ROM drive, tape drive, etc. Further, such information may be partitioned across multiple data storage devices 132 as described above. The operating system and the computer program may be comprised of instructions which, when read and executed by a computer, cause the computer to perform the steps necessary to implement and/or use the present invention. For example, the operating system and computer program may implement a Java VM 500 that can be used to execute a stored procedure in accordance with one or more embodiments of the invention. Computer programs and/or operating instructions may also be tangibly embodied in memory and/or data communications devices, thereby making a computer program product or article of manufacture according to the invention. As such, the terms "article of manufacture," "program storage device," and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Conclusion

This concludes the description of one or more embodiments of the invention. In summary, the invention describes a method, apparatus, and article of manufacture for using Java as a stored procedure programming language.

The method comprises obtaining an abstract data type attribute definition and wrapping the definition in a Java class that maintains the ability to retrieve and edit the ADT. Thereafter, a stored procedure written in the Java programming that uses the Java class is obtained. A user, the owner of a DBMS, or a third party vendor, may create such a stored procedure. The stored procedure is then executed on a Java virtual machine 500.

Other embodiments of the invention include a program storage device tangibly embodying instructions for performing the method steps above on a computer or similar device, and an apparatus for performing the foregoing operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of using Java as a stored procedure programming language comprising:

obtaining an abstract data type attribute from a database;

wrapping the abstract data type attribute in a Java class; and executing a stored procedure in a Java virtual machine, wherein the stored procedure is written in the Java programming language and uses the Java class.

2. The method of claim 1 wherein the abstract data type attribute is defined in C++.

3. The method of claim 1 wherein the Java class comprises a put method.

4. The method of claim 1 wherein the Java class comprises a get method.

5. The method of claim 1 further comprising the stored procedure utilizing a server side cursor to execute an SQL query.

6. A system for using Java as a stored procedure programming language comprising:

a database comprised of an abstract data type attribute;

a Java class wrapping the abstract data type attribute;

a stored procedure on a data server, the stored procedure written in the Java programming language using the Java class;

a Java virtual machine configured to execute the stored procedure.

7. The system of claim 6 wherein the abstract data type attribute is defined in C ++.

8. The system of claim 6 wherein the Java class comprises a put method.

9. The system of claim 6 wherein the Java class comprises a get method.

10. The system of claim 6 further comprising a server side cursor used by the stored procedure to an execute SQL query.

11. An article of manufacture for using Java as a stored procedure programming language comprising:

means for obtaining an abstract data type attribute from a database;

means for wrapping the abstract data type attribute in a Java class; and means for executing a stored procedure in a Java virtual machine, wherein the stored procedure is written in the Java programming language and uses the Java class.

12. The article of manufacture of claim 11 wherein the abstract data type attribute is defined in C ++.

13. The article of manufacture of claim 11 wherein the Java class comprises a put method.

14. The article of manufacture of claim 11 wherein the Java class comprises a get method.

15. The article of manufacture of claim 11 further comprising means for the stored procedure to utilize a server side cursor to execute an SQL query.

* * * * *